Patented Oct. 31, 1922.

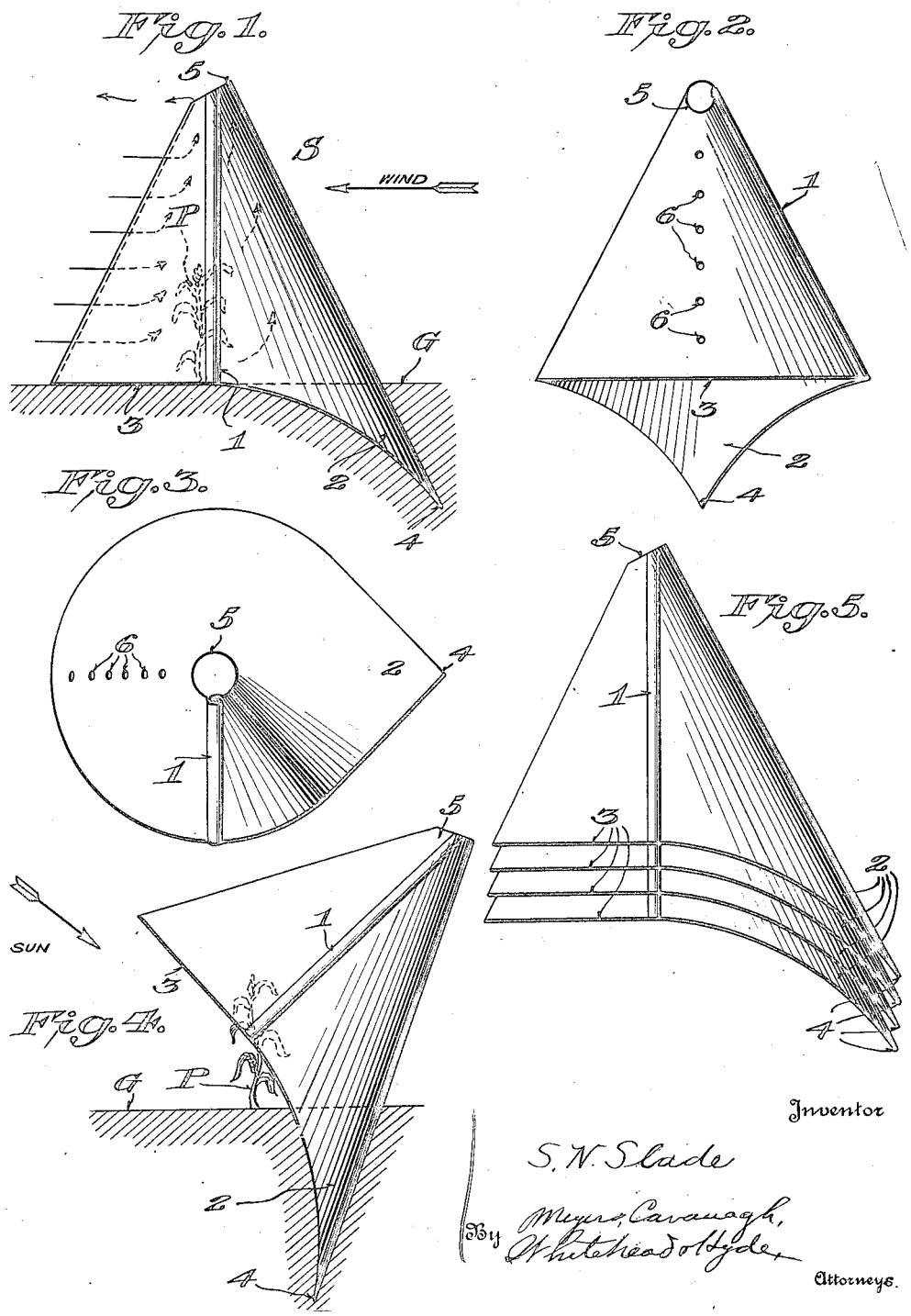

1,434,160

UNITED STATES PATENT OFFICE.

STARKIE NORMAN SLADE, OF DURHAM, NORTH CAROLINA.

PLANT PROTECTOR.

Application filed January 14, 1922. Serial No. 529,389.

*To all whom it may concern:*

Be it known that I, STARKIE NORMAN SLADE, a citizen of the United States, and resident of Durham, in the county of Durham and State of North Carolina, have invented certain new and useful Improvements in Plant Protectors, of which the following is a specification.

My invention relates to devices for protecting plants from wind, cold and frost. The principal object of the invention is to provide a simple and inexpensive protector or shield, which may be located or adjusted in different positions to shield a growing plant from the direct action of wind, to conserve and properly retain the ground heat about the plant during periods of low temperature, to protect seeds or young plants from the effects of soil packing, due to direct action of rain, to conserve heat about seeds to hasten sprouting, to stimulate growth of young plants when desired, and to permit sun and air to reach the plant in certain adjusted positions of the shield.

The characteristics and advantages of the invention are further sufficiently described in connection with a detailed description of the accompanying drawing, which shows an exemplifying embodiment of the invention. After considering this it will be evident to persons skilled in the art that modifications may be made without departing from the invention, and I contemplate the employment of any structures which are within the scope of the appended claims.

In the drawing:

Fig. 1 is a side elevation of a shield or protector embodying the invention in one operative position.

Fig. 2 is an elevation from the left of Fig. 1.

Fig. 3 is a top plan.

Fig. 4 is a side elevation showing the shield in another operative position.

Fig. 5 is a side elevation of a plurality of the protectors in "nested" relation.

The shield or protector S is desirably of pyramidal, and more specifically as here shown, is of substantially conical form and it is composed of any suitable sheet material, the most desirable material being sheet metal of substantial thickness, such as tin plate or galvanized sheet steel or iron. While sheet metal is probably the most suitable material for most purposes, other sheet material may be used, which has the necessary qualities of durability, strength, stiffness and moderate cost.

The protector S, assuming it to be of sheet metal, may be originally made in the form of a flat blank of suitable shape and rolled into conical form, as shown, and the meeting edges of the material are suitably connected together, this connection in the present instance being by means of an ordinary interlocking seam 1, extending down one side of the completed shield, and this seam may be soldered, although this is usually unnecessary. At one portion of the base the shield is provided with an anchor, which may be otherwise identified as a blade or foot, 2, projecting downward from the base outline 3 of the shield to a suitable distance, and most conveniently this anchor is formed integrally with the body of the shield, although in some cases it could evidently be a separate piece riveted or otherwise secured to the body. In one desirable form the anchor or blade is of modified triangular form, as best indicated in Fig. 2, terminating in a more or less sharp point 4 and having its surface more or less curved in the form of an extension of the main conical surface of the shield, this curvature of the anchor assisting materially in securing the shield in its different positions. Desirably the shield is provided with a top opening or vent 5 which is equivalent to a truncation of the conical body in a plane at an angle with the central axis, so that the vent is definitely inclined in a certain direction, this direction being preferably one substantially opposite or away from the side of the shield which carries the anchor 2. The shield is also desirably provided with one or more, usually a plurality of ventilating openings 6, these being arranged in the present instance in a line extending downward along the body of the shield at the side opposite to the anchor and desirably the lowest ventilating opening is located considerably above the base 3. Usually the area of the vent or top opening 5 is greater than the combined area of the ventilating openings 6.

The shield is shown in Fig. 1 in one of its operative positions in relation to a plant P. In this case the shield is placed so that the plant is centrally located within it and the blade or anchor 2 is thrust into the ground in such a direction that the base 3 is horizontal and rests directly in the ground. The side of the shield opposite the openings 6 is usually placed so that the prevailing wind strikes it, as indicated by a suitable legend and arrow in the figure. This is the arrangement used to protect the plant from low temperature. Wind coming from the indicated direction creates a partial vacuum about the vent 5 and air is drawn from the interior of the shield through this vent and exterior air flows in at a moderate rate through the ventilating opening 6. A regulated air circulation in an upward direction is thus maintained within the shield and heat which has been stored in the ground during the day rises about the plant and protects it from decidedly low temperatures. It has been found that the use of the shield in this manner will, in many cases, maintain a temperature about the plant from about ten to fifteen degrees higher than the external temperature. In the absence of any wind the shield protects the plant from dew and frost formation.

The shield may be adjusted in various positions for different purposes. In Fig. 4 the anchor 2 is thrust into the ground at such an angle that the base 3 is tilted up at a considerable angle allowing sunlight during the day time to reach the plant and to heat the ground around it. The readjustment of a great number of shields for a similar number of plants may be rapidly accomplished, the setting of the shield being accomplished by the single movement of thrusting the anchor into the ground at the proper angle and in the proper position in relation to the plant. The pointed and generally tapering shape of the thin metal anchor enables it to penetrate the soil readily, even if the soil cultivation is not especially thorough, and at the same time the rounded shape of the anchor enables it to maintain the shield rigidly in any necessary position against great wind and pressure. The anchor, shaped and connected to the shield in the described manner, not only prevents the shield from being blown over or away from its position, but effectively prevents it from being rotated by lateral wind pressure.

The shield is valuable for conserving heat around newly planted seeds to hasten their germination and also to prevent packing of the soil over the seeds. For this purpose the shield may be set slightly into the ground as indicated by the ground level G′, Fig. 1, over a seed located in the position of the plant P. Air is prevented from entering below the shield and the heat of the sun stored up in the ground during the day is retained at night by the shield, to a considerable extent. At the same time rain is prevented from striking the pulverized soil immediately around the seed and thus packing is prevented which greatly interferes with the early growth of the plant, especially in the case of large seeds which have great difficulty in breaking through a hard soil crust. When the seedling appears above the soil the shield may be tilted to the position shown in Fig. 4, to give the proper amount of sun and air to promote the normal growth of the plant, and in this position also, the soil adjacent to the plant is prevented from packing due to the direct action of rain, and sufficient moisture reaches the plant by seepage from the adjacent soil.

A great number of shields may be stored in small space by nesting them, as sufficiently shown in Fig. 5.

What I claim is:—

1. A plant shield of sheet material, adapted to substantially enclose a plant, having an open base and provided with an anchoring blade extending from the base and of substantial width, to retain the shield in different positions and prevent rotation.

2. A plant shield of sheet material in substantially conical form with an open base and having an anchoring blade extending from the base, the blade being laterally curved to effectively grip the soil.

3. A plant shield of sheet material in substantially conical form with an open base, and provided with an inclined top vent and one or more ventilating openings.

4. A plant shield of sheet metal in substantially conical form with an open base and having its apex truncated on an inclined plane producing a vent inclined toward one side of the shield, the shield being provided with ventilating openings at the side toward which the top vent is inclined.

5. A sheet metal plant shield in substantially conical form having an anchor blade conforming substantially to the conical curvature of the body extending from the base, the blade having a substantially pointed end to facilitate insertion of the blade into the soil.

6. A sheet metal plant shield in substantially conical form having an anchor blade extending from the base, the shield being provided with an inclined upper vent opening, the shield also having ventilating openings arranged substantially below the upper vent opening.

7. A sheet metal plant shield in substantially conical form having an anchor blade integral with the sheet material of the shield body and conforming to the conical curvature of the body extending from the base, the sides of the blade being convergent and forming a substantially pointed end to facilitate insertion of the blade into the soil, the shield being provided with a top vent opening inclined away from the side of the shield which bears the anchor, the shield also having ventilating openings arranged substantially below the top vent.

Signed at Durham, N. C., in the county of Durham and State of North Carolina, this 29 day of Nov., 1921.

STARKIE NORMAN SLADE.